Sept. 22, 1925.                         1,554,668
C. F. WAGNER
ELECTRIC HEATER FOR HOVERS
Filed May 21, 1923
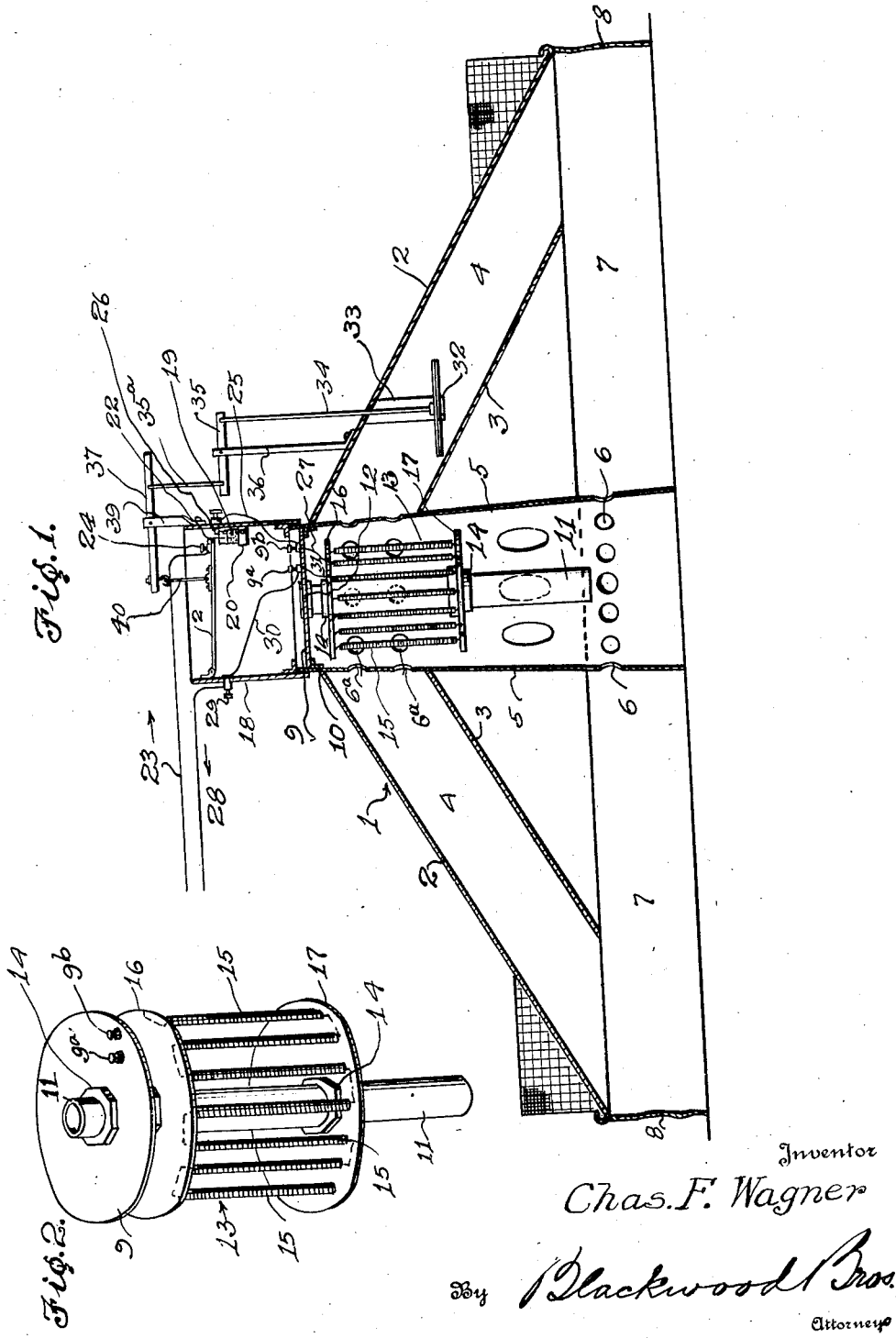
Inventor
Chas. F. Wagner
By Blackwood Bros.,
Attorneys Patented Sept. 22, 1925.

1,554,668

UNITED STATES PATENT OFFICE.

CHARLES F. WAGNER, OF RED BANK, NEW JERSEY.

ELECTRIC HEATER FOR HOVERS.

Application filed May 21, 1923. Serial No. 640,503.

*To all whom it may concern:*

Be it known that I, CHARLES F. WAGNER, residing at Red Bank, in the county of Monmouth and State of New Jersey, citizen of the United States, have invented certain new and useful Improvements in Electric Heaters for Hovers; and I do hereby declare the following to be a full, clear, and exact description of the invention, such as will enable others skilled in the art to which it pertains to make and use the same.

My invention relates to an improvement in electric heaters for hovers for brooding young chicks, more especially for use in connection with the hover of the general character of my Patent No. 1,373,037, dated March 29th, 1921.

The object of the invention is to control the quantity of heat generated in such manner that the proper temperature is constantly maintained and all the heat generated utilized thus avoiding all waste of heat.

A further object is to provide automatic means for controlling the degree of heat or temperature under all conditions which may arise and produce a perfectly uniform heat or temperature throughout the hover at all times, and at the same time distribute such heat or temperature.

A further object is to provide means for automatically establishing and interrupting the circuit between the source of supply of the electric current and the heat generator.

A still further object is to provide heating means for a hover which is exceedingly simple, inexpensive, economical and durable in construction and so effective in operation that the loss of chicks is eliminated or at least reduced to a minimum degree.

The invention consists in the several features and in the construction, combination and arrangement of such features as is more fully hereinafter described and claimed.

Referring to the drawings:—

Figure 1 is a central vertical section of the hover with the heating means installed therein.

Figure 2 is a perspective view of the heat generator.

In the drawings in which like reference characters denote like parts throughout the several views 1 represents the hover which is provided with an outer downwardly slanting casing or roof 2, and an inner downwardly slanting casing 3, spaced apart from the outer casing or roof 2 for the purpose of providing or forming an annular downwardly inclined hot air flue or duct 4.

The casings 2 and 3 are secured centrally to and supported by means of bolts or any other means, on a vertical heater casing 5 which is provided with a double series of openings 6ª in its upper portion for the exit of heat, which communicate with the annular heat flue or duct 4, and with a series of openings 6 in its lower portion for the inlet of heat to the vertical heat containing casing 5.

At the lower portion or bottom of the hover a cylindrical chick receiving, brooding or hovering chamber 7 is provided which communicates with the heat flue or duct 4.

In order to provide a closure for the side of the hover and at the same time afford means whereby the chicks may readily enter and leave the hovering chamber 7, and fresh air be supplied thereto, without losing or wasting any more heat, than is absolutely necessary, an annular curtain 8 is provided which may be made of any desired material, but which I preferably make of some flexible material.

The curtain being flexible, after the chicks have pushed it aside, in entering or leaving the hover, it will assume its normal position and prevent the heated air from passing out or leaving the hover.

The upper end of the heater casing 5 is open and just below said end a disk 9 is provided supported on brackets 10 projecting from the inner wall of the casing 5 and having binding posts 9ª and 9ᵇ; and 11 is a vertical heat conducting flue supported by the closure 9 and secured thereto by means of suitable lock nuts 12.

An electrical heat unit or generator 13 is mounted and secured on the heat flue 11, by means of lock nuts 14, or in any other suitable manner, and comprises a series of resistance or heat coils 15 electrically connected together and secured or supported between two discs 16 and 17, preferably made of fibre.

A casing or cylinder 18 is mounted on the top of the heat casing 5 and is provided with a switch 19 which preferably consists of a cup 20 containing mercury and oil and a hinged or pivoted arm 2, preferably made of fibre, having a depending switch point 22, which is adapted to be moved into and out of the mercury in the cup 20 and thereby make and break the electrical circuit or connections at that point.

The feed wires for the current, which is preferably about 110 volts, of the electric circuit, are connected to any suitable source of electrical current or energy, not shown, consist of a positive wire 23 in electrical connection with the switch point 22 and connected to the binding post 24 mounted on the pivoted arm 21, a wire 25 connecting the point 26 in the mercury cup with the binding post 9^b and a wire 27 connects the binding post 9^b with the series of coils 15.

The negative wire 28 connects with a binding post 29 on the casing 18, a wire 30 connects the binding post 29 with the binding post 9^a and a wire 31 connects the binding post 9^a with the series of coils 15.

The temperature of the air within the hover is automatically controlled or regulated by means of a thermostat 32 mounted in a bracket 33 depending from the casing 2, the thermostat being provided with a vertical rod 34 passing through the casing 2, and secured to a lever 35 which is pivotally mounted on a bracket 36 projecting upwardly from the outside of the casing 2, and a second lever 37 connected to the lever 35 by a link 35^a is pivoted to a bracket 39 secured to the casing 18 and is provided with a link 40 operatively connecting the pivoted arm 21 with the second lever 37.

The operation is as follows:—

When the temperature within the hover rises to the desired or required degree the diaphragm of the thermostat expands and due to this movement the series of levers automatically lift the pivoted arm 21 break the circuit in the mercury switch and shuts off the supply of current to the resistance coils thus allowing the temperature to fall to the normal or proper degree, by this means not allowing the temperature to reach a point above or below the degree desired and keeping the heat in the hover, continually at a steady uniform even temperature, and as the operation of the thermostat is automatic the heating of hover needs no attention after the current is turned on. The chicks that are to be hovered are placed in the hovering chamber 7, the electrical current turned on which energizes the resistance or heat generating coils, the heated air flows upward through the double series of openings in the heat casing 5 into and down the hot air flue or duct 4 into and through the hovering chamber 7 where it warms the chicks, and then again passes into the heat casing 5, through the openings 6, and is rewarmed and used over again as the operation is repeated.

Any excess of heated air will pass up and out of the casing 5 by means of the flue 11, thereby inducing circulation of heated air and ventilation of the chamber.

I do not desire to be understood as limiting myself to the specific details of construction and arrangement as herein described and illustrated, as it is manifest that variations and modifications can be made in the features of construction and arrangement in the adaption of the device to the various conditions of use without departing from the spirit of my invention and improvements. I therefore reserve the right to all such variations and modifications as properly fall within the scope of my invention and the terms of the following claims.

What I claim is:—

1. A hover comprising, in combination, a hover chamber having a centrally arranged heater casing extending upwardly therein and having a series of openings communicating with the chamber, an electrical heater in said casing above the chamber, a downwardly extending flue communicating with the casing adjacent to said heater and with the chamber adjacent to the outer walls thereof, and an outlet flue within the casing communicating with the lower portion of the casing near the level of said opening and arranged to discharge air and gases outside the hover.

2. A hover comprising, in combination, a hover chamber having a centrally arranged heater casing extending upwardly therein and having a series of openings communicating with the chamber, an electrical heater in said casing above the chamber, a downwardly extending flue communicating with the casing adjacent to said heater and with the chamber adjacent to the outer walls thereof, and an outlet flue supported from the top of the casing and carrying said heater.

3. A hover comprising a hover chamber, a heater casing communicating with said chamber, an electrical heater including a plurality of coils in the casing, a heat circulating flue adjacent to the heater communicating with the chamber and an outlet flue supporting the heater coils.

4. A hover comprising a hover chamber, a vertical heater casing centrally arranged in the chamber and having openings communicating therewith, a closure for said heater casing above the chamber, an electrical heater element below said closure, a hot air flue communicating with said heater casing near the heater element and connected to the chamber, and an outlet flue in the casing passing through said closure, said flues being arranged to promote ventilation and circulation in said hover chamber.

5. In a hover, a heater casing, an outlet flue in the casing for promoting ventilation, spaced plates of insulating material secured to said flue, and electrical heater coils between said plates arranged to heat said flue and to promote circulation of heated air in the hover.

6. A brooder comprising, in combination, a brooder chamber, a vertically disposed heater casing within said chamber, communicating therewith near top and bottom, a closure for the top of said casing, a heater in the casing above the chamber and arranged below said closure, and an outlet conduit for some of the heated air of said chamber arranged to be heated by said heater element to promote circulation of the air in said chamber and communicating therewith below said heater element.

In testimony whereof I have affixed my signature.

CHARLES F. WAGNER.